US007987416B2

(12) United States Patent
Loeser et al.

(10) Patent No.: US 7,987,416 B2
(45) Date of Patent: Jul. 26, 2011

(54) SYSTEMS AND METHODS FOR MODULAR INFORMATION EXTRACTION

(75) Inventors: Alexander Loeser, Berlin (DE); Falk Brauer, Dresden (DE); Wojciech Michal Barczyński, Dresden (DE)

(73) Assignee: SAP AG, Walldorf (DE)

( * ) Notice: Subject to any disclaimer, the term of this patent is extended or adjusted under 35 U.S.C. 154(b) by 902 days.

(21) Appl. No.: 11/939,794

(22) Filed: Nov. 14, 2007

(65) Prior Publication Data

US 2009/0125542 A1    May 14, 2009

(51) Int. Cl.
*G06F 17/00* (2006.01)
(52) U.S. Cl. .................. 715/200; 707/706; 715/230
(58) Field of Classification Search ................ 715/230, 715/200, 255; 707/706, 713
See application file for complete search history.

(56) References Cited

U.S. PATENT DOCUMENTS

| | | | | | |
|---|---|---|---|---|---|
| 5,031,121 | A | * | 7/1991 | Iwai et al. ................... | 715/246 |
| 6,108,711 | A | * | 8/2000 | Beck et al. ................... | 709/242 |
| 6,311,194 | B1 | * | 10/2001 | Sheth et al. ................... | 715/236 |
| 7,478,329 | B2 | * | 1/2009 | Stevens et al. ................ | 715/734 |
| 7,712,028 | B2 | * | 5/2010 | Kuruoglu et al. ............. | 715/254 |
| 7,761,437 | B2 | * | 7/2010 | Tsuzuki et al. ............... | 707/705 |
| 7,765,199 | B2 | * | 7/2010 | Dunie et al. .................. | 707/711 |
| 7,912,705 | B2 | * | 3/2011 | Wasson et al. ................. | 704/9 |
| 2002/0055909 | A1 | * | 5/2002 | Fung et al. .................... | 705/42 |
| 2002/0128925 | A1 | * | 9/2002 | Angeles ......................... | 705/26 |
| 2002/0156817 | A1 | * | 10/2002 | Lemus ............................ | 707/531 |
| 2003/0046430 | A1 | * | 3/2003 | Iwade et al. ................... | 709/246 |
| 2003/0061229 | A1 | * | 3/2003 | Lusen et al. ................... | 707/102 |
| 2003/0078899 | A1 | * | 4/2003 | Shanahan ....................... | 706/8 |
| 2003/0208354 | A1 | * | 11/2003 | Lin et al. ....................... | 704/9 |
| 2004/0172593 | A1 | * | 9/2004 | Wong et al. .................... | 715/512 |
| 2004/0243931 | A1 | * | 12/2004 | Stevens et al. ................ | 715/513 |
| 2005/0108630 | A1 | * | 5/2005 | Wasson et al. ................ | 715/513 |
| 2005/0131815 | A1 | * | 6/2005 | Fung et al. .................... | 705/39 |
| 2006/0085735 | A1 | * | 4/2006 | Shimizu ......................... | 715/512 |
| 2006/0217956 | A1 | * | 9/2006 | Nagao et al. .................. | 704/2 |
| 2007/0219970 | A1 | * | 9/2007 | Dunie et al. ................... | 707/3 |
| 2007/0255553 | A1 | * | 11/2007 | Nomoto ........................... | 704/9 |
| 2007/0294614 | A1 | * | 12/2007 | Jacquin et al. ................ | 715/512 |
| 2008/0222511 | A1 | * | 9/2008 | Kambhatla et al. ........... | 715/230 |
| 2009/0119274 | A1 | * | 5/2009 | Tsuzuki et al. ................ | 707/5 |
| 2009/0132373 | A1 | * | 5/2009 | Redlich .......................... | 705/14 |
| 2009/0144628 | A1 | * | 6/2009 | Stevens et al. ................ | 715/733 |

OTHER PUBLICATIONS

Liu et al., XWRAP: An XML-enabled Wrapper Construction System for Web Information Sources, IEEE 2002, pp. 1-11.*
Soderland, Learning Information Extraction Rules for Semi-Structired and Free Text, Googe 1999, pp. 233-272.*
Soderland, Learning Information Extraction Rules for Semi-Structured and Free Text, Google 1999, pp. 233-272.*
Phuong et al., Learning Rules to Extract Protein Interaction from Biomedical Text, Google 2003, pp. 148-158.*

* cited by examiner

*Primary Examiner* — Cong-lac Huynh
(74) *Attorney, Agent, or Firm* — Fountainhead Law Group P.C.

(57) ABSTRACT

Embodiments of the present invention include a computer-implemented method of extracting information. In one embodiment, the present invention comprises defining a plurality of reusable operators, wherein each operator performs a predefined information extraction task different from the other operators. Composite annotators may be created by specifying a composition of the reusable operators. Each operator may receive a searchable item, such as a web page or an annotation, and may generate one or more output annotations. The output annotations may be further processed by other reusable operators and the annotations may be stored in a repository for use during a search.

29 Claims, 15 Drawing Sheets

$ERC\_RULE(InAnno, r_1, OutAnnotType) : annot[]$ ~ 610

Algorithm 1 ERC_RULE operator ~ 620

Require: Annot *inAnnot*, Regex $r_1$, AnnotType *outAnnotType*
1: Annot[] *result*
2: Text *c* = *inAnnot*.getContent()
3: Matcher *m*= new RegexMatcher(*c*, $r_1$) {Semi *Java* matcher}
4: while (*m*.find()) do
5:    {Create new Annot and add to result}
6:    Annot *newAnnot* = createAnnot(*outAnnotType*)  ~ 621
7:    *newAnnot*.setParent(*inAnnot*) {Keep information about hierarchy}  ~ 622
8:    *newAnnot*.setMethod(*this*) {Keep information about method}  ~ 623
9:    *newAnnot*.setSpan(*m*.start()+*inAnnot*.getStart(), *m*.end()+*inAnnot*.getStart())
10:    *newAnnot*.setContent(*c*.substr(*m*.start(), *m*.end()))  ~ 624
11:    *result*.add(*newAnnot*)  ~ 625
12: end while
13: return *result*

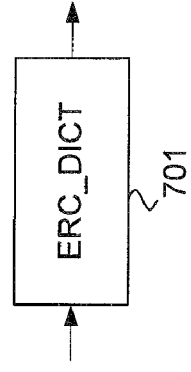

*Fig. 6*

$ERC\_DIC(InAnno, DIC, OutAnnotType) : annot[]$ ~ 710

Algorithm 2 ERC_DIC operator ~ 720

Require: Annot *inAnnot*, DIC *dic*, AnnotType *outAnnotType*
1: Annot[] *result*
2: Text *c* = *inAnnot*.getContent()
3: while DIC.hasNext() do
4:    Matcher *m*= new Matcher(*c*, *dic*.next()) {Semi *Java* matcher}
5:    while (*m*.find()) do
6:       Annot *newAnnot* = createAnnot(*outAnnotType*)
7:       *newAnnot*.setMethod(*this*)
8:       *newAnnot*.setParent(*inAnnot*)
9:       *newAnnot*.setSpan(*m*.start()+*inAnnot*.getStart(), *m*.end()+*inAnnot*.getStart())
10:       *newAnnot*.setContent(*c*.substr(*m*.start(), *m*.end()))
11:       *result*.add(*newAnnot*)
12:    end while
13: end while
14: return *result*

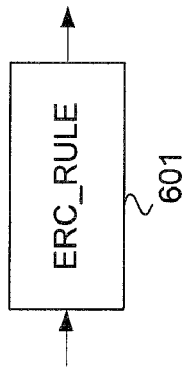

*Fig. 7*

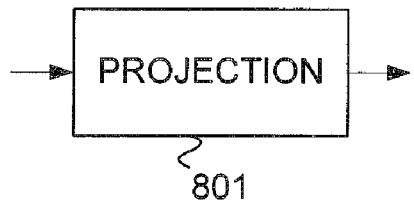

801

$PROJECTION(\ InAnnot_{annot[]}, r_1, r_2, OutAnnotType, context)$  ~ 810

---

Algorithm 3 Projection operator  ~ 820

Require: Annot *inAnnot*, Regex $r_1$, Regex $r_2$, AnnotType *outAnnotType*, int *context*
1: Annot[] *result*
2: Text $c$ = *inAnnot*.getContent()
3: Matcher $m_{start}$ = new RegexMatcher($c, r_1$)
4: bool $getNextMatch_{start}$ = true
5: Matcher $m_{end}$ = new RegexMatcher($c, r_2$)
6: bool $getNextMatch_{end}$ = false
7: $m_{end}$.find()
8: $m_{start}$.find()
9: while ($m_{end}$.exist() AND $m_{start}$.exist()) do
10:   if ($m_{end}$.end()-$m_{end}$.start() > *context*) then
11:     $getNextMatch_{start}$ = true
12:     $getNextMatch_{end}$ = false
13:   else if ($m_{end}$.end() - $m_{end}$.start() > 0) then
14:     ... {Create new annotation and add to *result*}
15:   else
16:     $getNextMatch_{end}$ = true
17:   end if
18:
19:   if ($getNextMatch_{end}$ == true) then
20:     $m_{end}$.find() ⋏ $getNextMatch_{end}$ = false
21:   end if
22:   if ($getNextMatch_{start}$ == true) then
23:     $m_{start}$.find() ⋏ $getNextMatch_{start}$ = false
24:   end if
25: end while
26: return *result*

*Fig. 8*

$LC(InAnno, ContextAnno, OutAnnotType, context) :$ ~ 1010
$annot$ $LC(InAnno, ContextAnnoType,$ ~ 1020
$OutAnnotType, contextW):annot[\,]$ ---
Algorithm 4 LC operator ~ 1030

Require: Annot *inAnnot*, Annot *contextAnnot*, AnnotType *outAnnotType*, int *context*
1: Annot *result*
2: Annot *parent* = *inAnnot*.getParent()
3: Text c = *parent*.getContent()
4: if inAnnot.getEnd() + context >= contextAnnot.getBeg() then
5:  Text *new_content* = c.substring(*inAnnot*.getEnd, *contextAnnot*.getBeg())
6:  ... {create new annotation of type *AnnotType* and content *new_content*}
7: end if
8: return *result*

INPUT ANNOTATIONS

```
Log analysis: Termination TSV_TNEW_PAGE_ALLOC_FAILED
Runtime error TSV_TNEW_PAGE_ALLOC_FAILED
Dump: OBJECTS_OBJREF_NOT_ASSIGNED in the Customizing
Dump: OBJECTS_OBJREF_NOT_ASSIGNED during change run
APD Dump: TSV_TNEW_PAGE_ALLOC_FAILED (but processed)
RSSOREKI: TSV_TNEW_PAGE_ALLOC_FAILED
```
~1040

Extracted Error Messages

| TSV_TNEW_PAGE_ALLOC_FAILED |
| OBJECTS_OBJREF_NOT_ASSIGNED | ~1050

Extracted Left Context

Log Analysis: Termination
Runtime error
Dump:
ADP Dump:
RSSOREKI:
~1060

Extracted Right Context in the Customizing
during change run
(but proceeds)
~1070

*Fig. 10B*

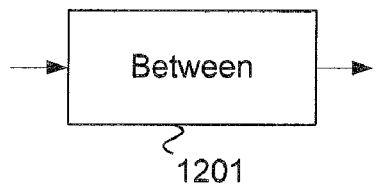

$BETWEEN(InAnno, L\_Anno, R\_Anno,$    1210
$OutAnnotType, contextW):annot[\,]$ $BETWEEN(InAnno, L\_Annotype, R\_Annotype,$    1220
$OutAnnotType, contextW):annot[\,]$

---

Algorithm 5 BETWEEN operator    1230
---
Require: Annot *inAnnot*, AnnotType *l_Annotype*, AnnotType *r_Annotype*, int *context*
1: Annot[]  result
2: Text *in_content* = inAnnot.getContent()
3: Annot[] *l_annots* = inAnnot.getAnnotOfType(*l_Annotype*) {The annots are sorted by position}
4: int *l_idx* = *l_annots*.size()-1
5: Annot[] *r_annots* = inAnnot.getAnnotOfType(*r_Annotype*) {The annots are sorted by position}
6: int *r_idx* = *r_annots*.size()-1
7: bool *is_r_found* = false
8: while *l_idx* > 0 AND *r_idx* > 0 do
9:
10:    while *l_annots*[*l_idx*].getEnd() < *r_annots*[*r_idx*].getBeg() AND *r_idx* > 0 do
11:      *is_r_found* = true
12:      *r_idx*=*r_idx*-1
13:    end while
14:    if *is_r_found* AND *l_annots*[*l_idx*].getEnd() - *r_annots*[*r_idx*].getBeg() <= *context* then
15:      Text *new_content* = *in_content*.substring( *l_annots*[*l_idx*].getEnd, *r_annots*[*r_idx*+1].getBeg())
16:      ... {create new annotation of type *AnnotType* and content *new_content*}
17:    end if
18:    *l_idx*=*l_idx*-1
19:    *is_r_found* = false
20: end while
21: return *result*

*Fig. 12*

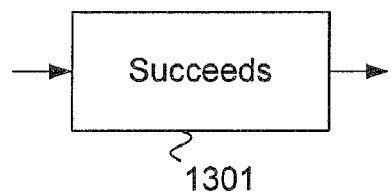

1301

*SUCCEEDS(InAnno, L_Anno, r_1, R_Anno,* ∼ 1310
*OutAnnotType, context):annot[ ]*

*SUCCEEDS(InAnno, L_AnnoType, r_1, R_AnnoType,* ∼ 1320
*OutAnnotType, contextW):annot[ ]*

∼ 1330

Algorithm 6 SUCCEEDS operator

Require: Annot *inAnnot,* Regex *r_1,* AnnotType *l_Annotype,*
  AnnotType *r_Annotype*
1: Annot[] *result*
2: Annot *common_parent* = getCommonParent(*l_Annotype,*
  *r_Annotype*) {Get common parent of two annotations}
3: if *common_parent* == *null* then
4:   return *result* {The annotation do not come from the same
    document so return.}
5: end if
6: if *l_Annotype*.getEnd() <= *r_Annotype*.getBeg() then
7:   Text *c_between* = *common_parent*.getContent(
    *l_Annotype*.getEnd, *r_Annotype*.getBeg())
8:   if *c_between* ∼ /*r_1*/ then
9:     *result*.add(BIND(*l_Annotype,*    *r_Annotype,*
      *RELATION*) {Create complex annotation, the
      parameter *annotType* has been omitted}
10:   end if
11: end if
12: return *result*

*Fig. 13*

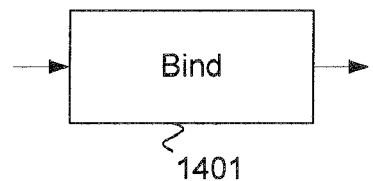

1401

$BIND(InAnno1, InAnno2, AnnotType, Type):annot$  ~1410

---
Algorithm 7 BIND operator  ~1420

Require: Annot *inAnnot1*, Annot *inAnnot2*, AnnotType *annotType*, Type *type*
1: Annot *result*
2: Annot *common_parent* = getCommonParent(inAnnot1, inAnnot2)
3: {Guard code.}
4: if *common_parent == null* then
5:    return *result*
6: end if
7: Annot *new_annot* = createAnnot(*annotType*)
8: *new_annot*.setParent(*common_parent*)
9: *new_annot*.setBeg(*inAnnot1*.getBeg())
10: *new_annot*.setEnd(*inAnnot2*.getEnd())
11: *new_annot*.addChild(*inAnnot1*, *type*)
12: *new_annot*.addChild(*inAnnot2*, *type*)
13: return *new_annot*

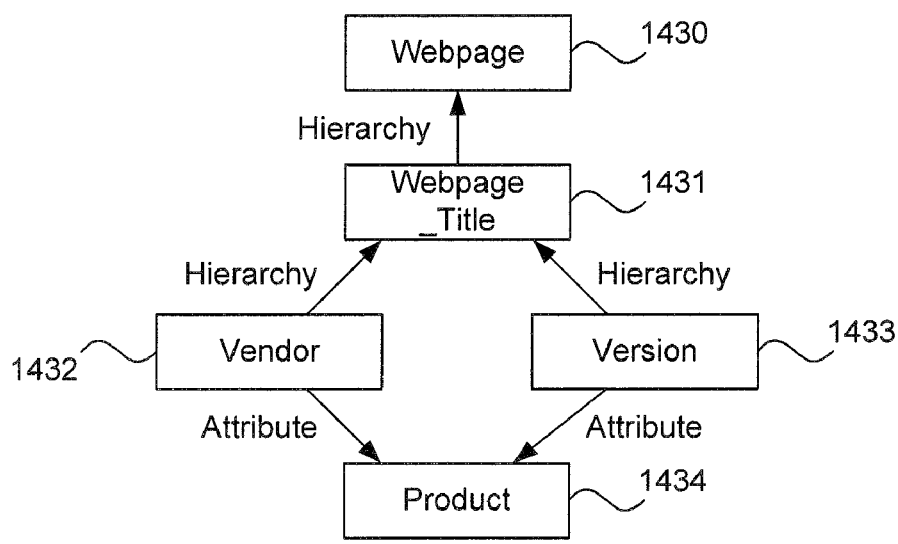

*Fig. 14B*

SYSTEMS AND METHODS FOR MODULAR INFORMATION EXTRACTION

BACKGROUND

The present invention relates to information extraction, and in particular, systems and methods for modular information extraction.

Generally speaking, search engines provide an interface that allows a user to query a group of items based on specific criteria about an item of interest. FIG. 1 illustrates an exemplary search engine. Search engine 120 receives criteria 110. Criteria 110 may include keywords or other descriptors describing the item of interest. Search engine 120 performs a query on items residing in or across information base 121 based on criteria 110 and returns a list of items as results 130. Depending on the criteria provided and the algorithm performed, different items prioritized in different manners may be returned to the user. The group of items may range from information on the World Wide Web to documents within a company database.

To improve the quality of the search, items across information base 121 may be preprocessed. For example, an extraction engine may parse items and extract keywords or phrases that describe portions of the items. These keywords or phrases may be used by search engine 120 in the future to match search criteria provided by a user. FIG. 2 illustrates an example of preprocessing a document. Information extraction engine 220 generates keywords 230 based on common phrases within document 210. These keywords are a form of annotations as set forth below. Once the keywords are generated, they are stored (e.g., within document 210 or in a repository) for matching with user specified search criteria.

As the group of items in information base 121 increases, it becomes increasingly difficult to generate accurate search results. For example, a query for a desired document may be successful within an information base of 100 items. However, when the information base is expanded to 10,000 items or more the same query may not return the desired document. This has led to increasing demand for precise search engines. One method of improving search engines is to improve the extraction of information from the items.

One particular problem with existing information extraction technology is the lack of precision for keyword based search queries. For instance, the same search keywords typically occur with varying degrees of frequency to find the same or different items of information. However, even though the correct result for a number of given queries may have been available in the information base, none of the right results may have been returned or identified as more relevant (e.g., returned in the first three answer pages or 30 result links) by the search engine.

The ultimate goal of any search system is to answer the intention behind the query. Unfortunately, building extraction systems based on intention recognition technology remains a time and cost intensive project. First, common intentions need to be unraveled. Next, possible answer sources need to be identified. Third, for each source, specific information extraction technologies need to be developed to catch entities and relationships from relevant documents. Last, user intentions and content sources change over time, thus the search engine not only needs to be adjusted but also extend to new search intention and content sources.

The problem of extracting and matching entities is difficult. Sophisticated approaches for named entity recognition (or record linkage, entity matching, reference reconciliation, duplicate detection and fuzzy matching) have typically been based on rules or on learning techniques. Unfortunately, typical approaches to develop information extraction ("IE") programs have not been very satisfying. Perhaps the most straightforward approach is to employ an off-the-shelf, monolithic IE 'blackbox'. Monolithic IE techniques are used to spot relevant entities and relationships in the underlying document corpus. However, this approach is cost intensive, difficult to maintain and difficult to extend. In particular, this approach severely limits the expressiveness of IE programs that can be developed. Hence, the most popular approach today is to decompose an IE task into smaller subtasks, apply off-the-shelf IE blackboxes or write hand-crafted code to solve each subtask, 'stitch' them together (e.g., using Perl, Java, C++), and perform any necessary final processing. This approach has the problem of generating large IE programs that are difficult to understand, debug, modify, and optimize.

One approach has proposed compositional frameworks for developing IE programs. A prime example of such frameworks is UIMA. UIMA stands for Unstructured Information Management Architecture. UIMA is a component software architecture for the development, discovery, composition, and deployment of multi-modal analytics for the analysis of unstructured information and its integration with search technologies. UIMA proposes an 'object-oriented' language with standard object APIs. This language allows developers to code each IE subtask as an extraction object, then compose new extraction objects from existing objects. Such languages can make writing, debugging, and modifying IE programs much easier. To generate new extraction objects for such UIMA-like languages 'generic' information extraction and composition operators would be extremely valuable.

Thus, there is a need for the improved systems and methods for information extraction. The present invention solves these and other problems by providing systems and methods for modular information extraction.

SUMMARY

Embodiments of the present invention include systems and methods for modular information extraction. In one embodiment, the present invention includes a computer-implemented method of extracting information comprising defining a plurality of reusable operators, wherein each operator performs a predefined information extraction task different from the other operators, specifying a composition of said reusable operators to form a composite annotator, wherein each operator receives a searchable item and generates one or more output annotations, and storing the output annotations for use during a search.

In one embodiment, the plurality of reusable operators are an extraction operator, a context operator, or a composition operator.

In one embodiment, the extraction operator identifies features based on predefined criteria and generates one or more output annotations comprising the features extracted from one or more searchable items.

In one embodiment, the searchable items comprising text, wherein the extraction operator extracts specified text using a specified rule, and assigns a specified type to each of the one or more output annotations, wherein extracted features in the one or more output annotations comprise text that satisfies the rule.

In one embodiment, the searchable items comprising text, wherein the extraction operator extracts specified text by matching text in each of said searchable items against a specified list of text and assigns a specified type to each of the one or more output annotations.

In one embodiment, the searchable items comprising text, wherein the extraction operator extracts specified text by matching text in each of said searchable items against a first rule and a second rule, wherein if text satisfies the first rule and the second rule, text between the text satisfying the first rule and text satisfying the second rule is stored in an output annotation, and wherein the extraction operator assigns a specified type to each of the one or more output annotations.

In one embodiment, the context operator identifies features based on one or more other annotations and generates one or more output annotations comprising the identified features extracted from one or more searchable items.

In one embodiment, the context operator identifies features based on predefined analysis criteria.

In one embodiment, the searchable items comprise text, and wherein the context operator receives an input annotation and a reference annotation and generates an output annotation comprising a plurality of text adjacent to the reference annotation.

In one embodiment, the context operator receives a specification of the output annotation type.

In one embodiment, the context operator receives an analysis window specifying the number of characters to be extracted from the input annotation.

In one embodiment, the context operator extracts text to the left of said reference annotation.

In one embodiment, the context operator extracts text to the right of said reference annotation.

In one embodiment, the composition operator generates one or more output annotations based on a relationship between a plurality of input annotations.

In one embodiment, the composition operator generates one or more output annotations based on a relationship between an input annotations and an input annotation type.

In one embodiment, the searchable items comprise text, and wherein the composition operator receives an input annotation and two reference annotations and generates one or more output annotations comprising text between the two reference annotations.

In one embodiment, the composition operator receives a specification of an output annotation type.

In one embodiment, the composition operator receives a specification of a context window.

In one embodiment, the searchable items comprise text, and wherein the composition operator receives an input annotation and two reference annotation types and generates one or more output annotations comprising text between the two reference annotation types.

In one embodiment, the two reference annotation types each comprising a set comprising a plurality of annotations.

In one embodiment, the searchable items comprise text, and wherein the composition operator receives an input annotation, two reference annotations, and a rule, and generates one or more output annotations comprising text between the two reference annotations that satisfy the rule.

In one embodiment, the searchable items comprise text, and wherein the composition operator receives an input annotation, two reference annotation types, and a rule, and generates one or more output annotations comprising text between the two reference annotation types that satisfy the rule.

In one embodiment, the composition operator specifies relationships between annotations based on the annotation processing operations used to process said annotations.

In one embodiment, the composition operator specifies that a first annotation is composed from one or more second annotations.

In one embodiment, the composition operator specifies that a first annotation was created from one or more second annotations.

In one embodiment, the composition operator receives a plurality of input annotations, a specification of the relationship type, and a specification of the output annotation type.

In one embodiment, the output annotation is an object, said object having a type specified by said specification of the output annotation type, and said object storing an identifier for each of said input annotations and further storing said specification of the relationship type.

In one embodiment, the output annotation object further stores a common parent to at least two of said plurality of input annotations.

In another embodiment, the present invention includes a computer-implemented method of extracting information comprising accessing a plurality of documents, generating a plurality of annotations from the documents, assigning an annotation type to each of the plurality of annotations, processing the annotations using an annotator, wherein the annotator comprises a plurality of reusable composable operators, and in accordance therewith, generating a plurality of output annotations, and storing the output annotations in a repository for use by a search engine.

In one embodiment, the plurality of reusable composable operators comprise one or more of a rule extraction operator, a dictionary extraction operator, a left context operator, right context operator, a between operator, a rule based composition operator, and a composition operator that binds multiple annotations.

In one embodiment, the annotations are objects, and wherein text from said documents is stored as a parameter in said objects.

In one embodiment, the method further comprises associating an identifier with an output annotation, the identifier specifying an input annotation to one of said operators used to generate said output annotation, and storing the identifier in said repository.

In one embodiment, the search engine accesses the output annotation in the repository, accesses said identifier, and accesses the input annotation using the identifier.

In one embodiment, the method further comprises associating an identifier with an output annotation, the identifier specifying an operator used to generate said output annotation, and storing the identifier in said repository.

In one embodiment, the search engine accesses the output annotation in the repository, accesses said identifier, and processes a search request based on the identifier specifying the operator.

In another embodiment, the present invention includes a computer-readable medium containing instructions for controlling a computer system to perform a method of extracting information comprising receiving a plurality of first annotations, processing the plurality of first annotations using an reusable extraction operator, and in accordance therewith, generating a plurality of second annotations, and processing the plurality of second annotations using a reusable context operator or a reusable composition operator, and in accordance therewith, generating a plurality of third annotations.

In one embodiment, the first annotations comprises text, wherein the extraction operator identifies text in the first annotations that satisfy one or more rules or match text in a predefined list of text, and generates one or more output annotations comprising the identified text.

In one embodiment, the second annotations comprises text, wherein the plurality of second annotations are processed using a reusable context operator, and wherein the context operator receives each of the second annotations and a reference annotation and generates output annotations comprising a plurality of text adjacent to the reference annotation.

In one embodiment, the method farther comprises processing the plurality of third annotations using a reusable composition operator, wherein the composition operator receives each of the third annotations, one or more first reference annotations, and one or more second reference annotations, and generates output annotations comprising text between the first and second reference annotations.

In one embodiment, the composition operator receives a rule, and wherein output annotations comprise text that satisfies the rule, and if an annotation in the plurality of third annotations does not include the first reference annotation or the second reference annotation or does not satisfy said rule, then no output annotation is generated by the composition operator.

In one embodiment, the second annotations comprises text, wherein the plurality of second annotations are processed using a reusable composition operator, wherein the composition operator receives each of the second annotations, one or more first reference annotations, and one or more second reference annotations, and generates output annotations comprising text between the first and second reference annotations.

In one embodiment, the method further comprises storing the plurality of third annotations in a repository and accessing the plurality of third annotations in response to a search request.

The following detailed description and accompanying drawings provide a better understanding of the nature and advantages of the present invention.

BRIEF DESCRIPTION OF THE DRAWINGS

FIG. 6 illustrates one example of a extraction operator according to one embodiment of the present invention.

FIG. 7 illustrates another example of a extraction operator according to one embodiment of the present invention.

FIG. 8 illustrates another example of an extraction operator according to one embodiment of the present invention.

FIGS. 10A-B illustrate examples of context operators according to one embodiment of the present invention.

FIG. 12 illustrates one example of a composition operator according to one embodiment of the present invention.

FIG. 13 illustrates another example of a composition operator according to one embodiment of the present invention.

FIGS. 14A-B illustrate another example of a composition operator according to one embodiment of the present invention.

DETAILED DESCRIPTION

Described herein are techniques for information extraction. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
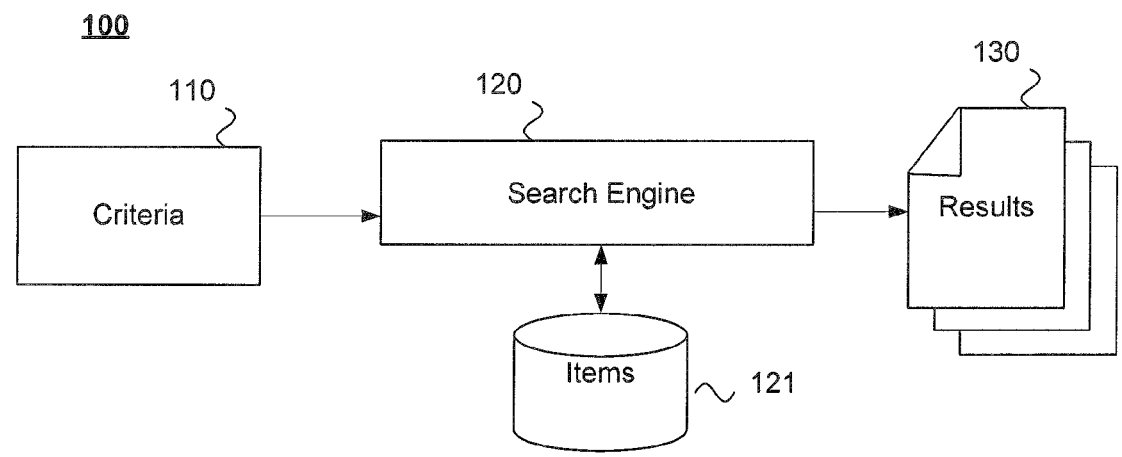
FIG. 1 illustrates an exemplary search engine.
Figure 2:
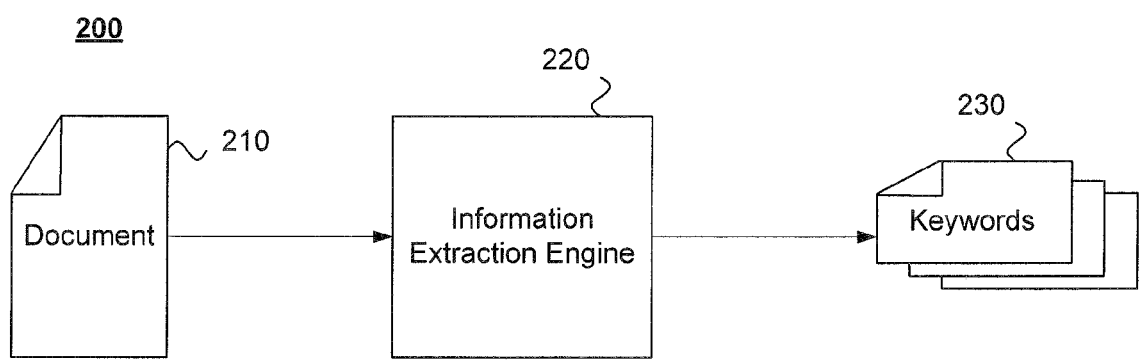
FIG. 2 illustrates an example of preprocessing a document.
Figure 3:
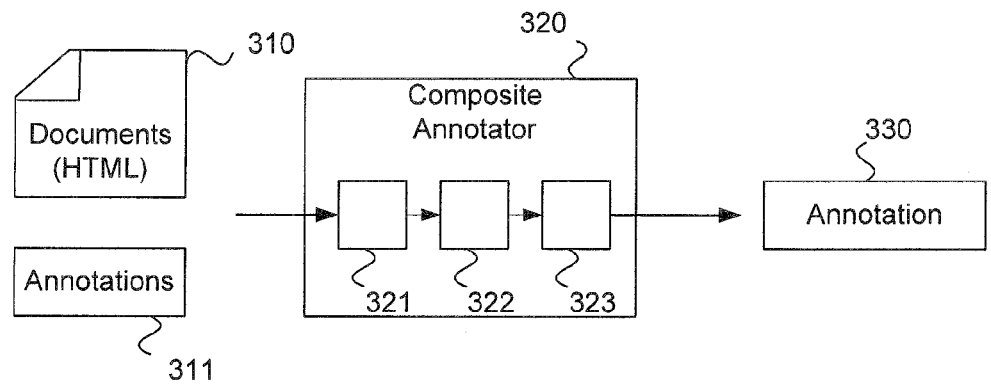
FIG. 3 illustrates an information extraction system according to one embodiment of the present invention.

FIG. 3 illustrates an information extraction system according to one embodiment of the present invention. Information extraction system 300 may be used to extract descriptors, also known as annotations, from a plurality of searchable items such as documents. In one example, these items are located on a company server, a company portal, or accessible through a company intranet. In another example, these documents are HTML documents or other searchable items located on the World Wide Web. Example documents may contain a combination of data placed together wherein each piece of data may be interpreted with a certain context.

FIG. 3 illustrates a technique for generating annotations according to one embodiment of the present invention. In this example, documents 310 (e.g., HTML pages) or annotations are processed by an annotator 320 to generate other annotations 330 that may be used to improve search results. An annotation is an extracted part of the item, such as the title of an html page or a recognized product name, which may be used to facilitate information extraction. Each annotation may be identified by a unique id, for example. An annotation may include text, the beginning and the end where the annotation was found in the original document, and an annotation type, for example. As used herein, the term "text" is defined broadly to mean letters, numbers, or any other characters or symbols, including ASCII elements or elements of an HTML page, for example. Annotations may be generated using annotators. Example annotators may include small information extraction programs that are composed using one or several operators. Annotators return a set of annotations. Annotators may be run either on already existing annotations created by other annotators or on an entire document. Annotators may create new annotations of a specific type (e.g., products, error messages, etc.). The annotation type is denoted herein as annotType.

Embodiments of the present invention include using a plurality of reusable operators to generate annotations that are useful in performing information extraction. Reusable operators may be combined to form annotators to process annotations. Accordingly, a variety of powerful annotators may be created quickly and efficiently by reusing the operators to create different compositions resulting in different annotators and annotations. In FIG. 3, a composite annotator 320 is made up of a composition of reusable operators 321, 322, and 323. Operators form the smallest part of the larger composite annotator. Operators may be composed to form simple or very complex annotators. In FIG. 3, a first operator 321 operates on a document, a preexisting annotation, or some other input. Further processing may be performed by operator 322, which may receive the output of operator 321 in addition to other inputs, for example. Processing is further refined by operator 323, and one or more annotations 330 may be generated by the composite annotator 320.

In some embodiments, operators may comprise context. For example, some operators may request a context parameter as input. In some applications context may be used to denote certain text boundaries when executing an operator. For instance, three types of context boundaries are provided as examples below: (i) a given window of characters, (ii) a given window number of terms, or (iii) sentence boundaries determined using natural language processing ("NLP") (e.g., when does a sentence finish).

Figure 4:
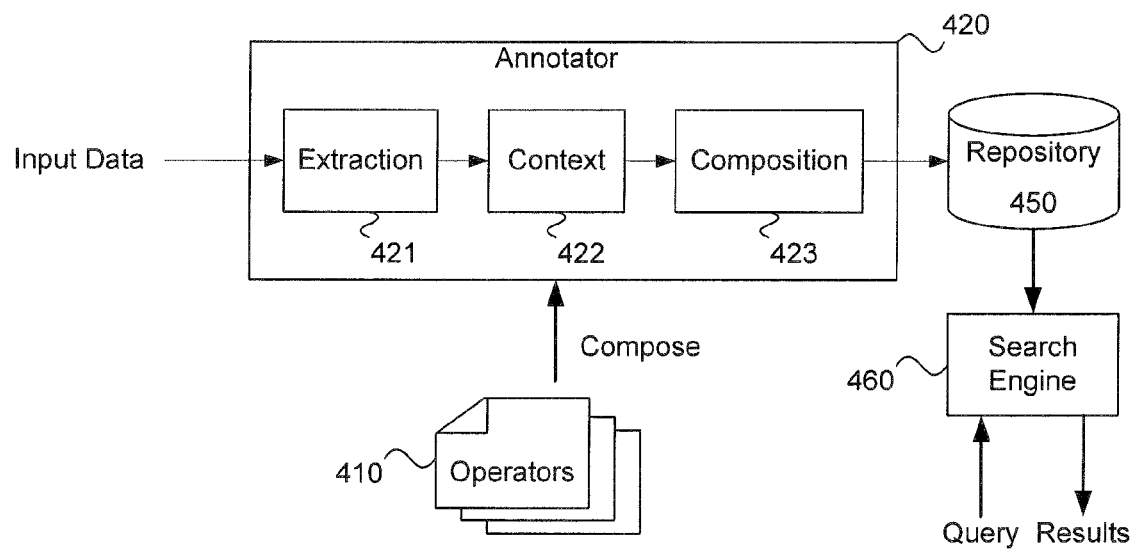
FIG. 4 illustrates an annotator according one embodiment of the present invention.

FIG. 4 illustrates an annotator according one embodiment of the present invention. Generally, an annotator comprises one or more operators. These operators may be selected from a preexisting group of operators that each perform a specific predefined function (e.g., instantiations of generic reusable operators), for example. In this example, operators 410 may include a small set of generic information extraction operators that are both modular and reusable. The operators may extract relevant entities and relationships from unstructured text into new extraction objects (i.e., annotations). In some embodiments, the reusable nature of the operators also allows them to be instantiated and combined into more complex information extraction programs. In this embodiment, annotator 420 includes three types of operators: (i) an extraction operator, (ii) a context operator, and (iii) a composition operator. Extraction operators identify features based on predefined criteria and generate one or more output annotations comprising the features extracted from one or more searchable items. Context operators identify and extract features based on other annotations or predefined analysis criteria, or both, and output one or more new annotations. Composition operators generate annotations based on the relationships between multiple input annotations or annotation types. As illustrated in FIG. 4, an extraction operator 421, a context operator 422, and a composition operator 423 may be cascaded to generate a variety of different annotations. The output annotations generated by any of the operators may be stored in a repository 450, such as a database, and used by a search engine 460 (e.g., alone or together with other information) to improve the results the search engine returns in response to queries. It is to be understood that the above operators may be composed in any desired fashion in different orders as required by a particular application. Examples of such compositions are shown below. By coupling these operators together in different ways, annotator 420 may combine multiple simple operations to form complex ones. In one embodiment, these operators may be domain independent, thereby allowing developers to apply the small set of well defined operators in a variety of programming environments. In another embodiment, the modular nature of the operators allows them to be optimized by a variety of optimization techniques.

Figure 5:
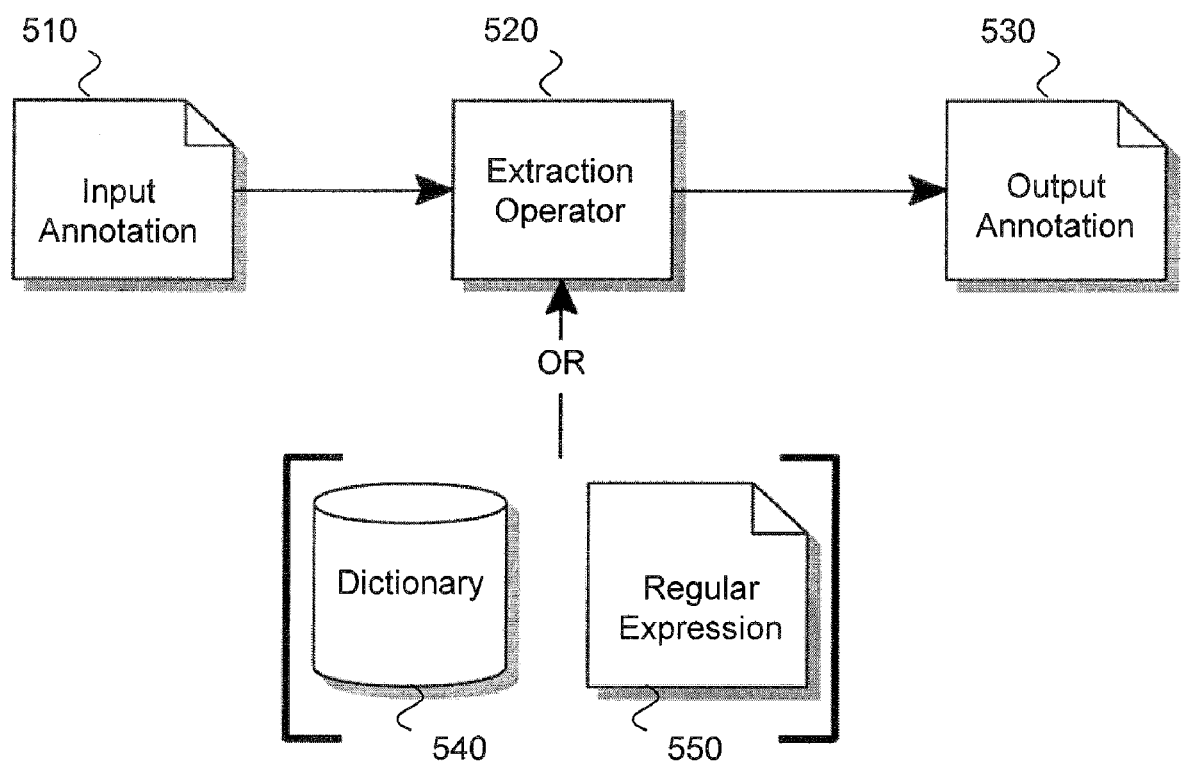
FIG. 5 illustrates a extraction operator according to one embodiment of the present invention.

FIG. 5 illustrates an extraction operator according to one embodiment of the present invention. Extraction operator 520 is coupled to input annotation 510 for receiving the input annotation. In one example, the input annotation may be the output generated from another operator. In another example, it may be a document or a HTML document. Although extraction operator 520 receives one annotation in this embodiment, the extraction operator may also receive multiple annotations, thereby allowing extraction operator to process multiple input annotations simultaneously. Extraction operators according to embodiments of the present invention may receive an input, such as an annotation or document, and may extract information that satisfies a predefined criterion. For example, an extraction operator may receive one or more annotations and a rule (e.g., a regular expression) and extract information from the input annotation if certain portions of the input annotation satisfy the rule. As another example, an extraction operator may receive one or more annotations and a list or dictionary and extract information from the input annotation if certain portions of the input annotation match entries in the list or dictionary. For example, extraction operator 520 is further coupled to dictionary 540 or regular expression 550 to provide matching criteria. Depending on the extraction operator, one of these may be received as an additional input. Extraction operator 520 may generate a new annotation by attempting to match input annotation 510 with dictionary 540 or against a regular expression 550. If a match occurs or if the regular expression is satisfied, an output annotation 520 is created. If there are multiple input annotations or multiple matches, extraction operator 520 may generate multiple output annotations. In one example, these multiple output annotations are stored as a set.

FIG. 6 illustrates one example implementation of an extraction operator according to one embodiment of the present invention. The entity recognition rule ("ERC_RULE") operator 601 may extract text by matching an input annotation with a regular expression. It is to be understood that the reusable operators according to the present invention may be represented and composed as icons displayed on a screen, as scripts, or as objects in program code, for example. One example implementation of ERC_RULE operator 601 is shown at 610. In this example, ERC_RULE operator 601 receives an input annotation ("InAnno"), a regular expression ("r1"), and generates an output annotation ("annot[ ]") having a specified type ("OutAnnotType") by matching the input annotation against the regular expression. Algorithm 620 illustrates one example implementation of ERC_RULE operator 610. The operator may search the input annotation for the regular expression. If the regular expression is found, the operator may generate an output annotation and store it in a set of annotations.

In this example, the annotation may be an object with additional parameters including type information 621, hierarchy information 622, method information 623, span 624, and content 625. Many of these properties are not algorithm specific and therefore, may be incorporated into other generic operators discussed below. Type information 621 may store the output annotation type, thereby allowing a user to improve the search using the type of information returned. Hierarchy information 622 may be stored using setParent. For example, information about the input annotation may be stored in the output annotation to determine the input annotation used to create the output annotations. This information may be used so that downstream annotations may be examined to determine one or more upstream annotations such annotations were created from. Here, the output annotation stores an annotation identifier ("ID") corresponding to or otherwise identifying the input annotation that was used to generate the output annotation. Method information 623 may store the operator used to generate the new annotation. For example, the output annotation may store an identifier describing the processing technique used to generate the output annotation from the input annotation. In this example, setMethod may cause an ID corresponding to the ERC_Rule operator to be stored in the output annotation. Span 624 may store the beginning and end index of the output annotation with respect to the input annotation. For example, setSpan may determine where in the input annotation the text in the output annotation was found. Content 625 may store the actual text. For example, setContent may be used to set the content of the output annotation based on the rule. While the above features are illustrated here in the context of the ERC_RULE operator, it is to be understood that other operators may use store the same or similar information in output annotations. This information may be stored in a repository with the output annotations to improve the quality of search results from a search engine. For example, using the information described above, a search engine may analyzed not only the content of the annotations, but also analyze and use information about the annotations used to create annotations, the operation used to create the annotations, and the location of text in related annotations.

As a specific example, ERC_RULE operator may receive input annotation "SAP NETWEAVER 5.0," a simple regular expression to capture the version of a product (e.g. rule=\d\.(\d1,+)\z), and output annotation type "SAP product version." With these inputs, the operator may generate an output annotation of the type "SAP product version" which begins at character 14, ends at character 16, and includes the content "5.0."

FIG. 7 illustrates another example of a extraction operator according to one embodiment of the present invention. Entity recognition dictionary ("ERC_DIC") operator 701 performs a dictionary based approach. The dictionary based approach may extract text by matching the input annotation against a list or dictionary of words, phrases or other predefined text. If a match occurs, an output annotation may be generated. In one example implementation, ERC_DIC operator 710 receives input annotation ("InAnno"), dictionary ("DIC"), and generates an output annotation ("annot[ ]") having a specified output annotation type ("OutAnnotType"). If a portion of the input annotation matches a word from the dictionary, an output annotation is generated and added to set of annotations "annot[ ]." Algorithm 720 illustrates one example implementation of ERC_DIC operation 710. The algorithm may iterate through the entries in the dictionary and attempt to match the entry with a portion of the input annotation. If a match is found, a new annotation may be generated. The new annotation may include the parameters discussed in FIG. 6. In a specific example, a user may desire to recognize the vendor information from a software product where the output annotation type is "Vendor," the input annotation is "SAP NETWEAVER 5.0," and the list of words stored in the dictionary may include "SAP," "IBM," "Oracle," and "Google." By providing these three variables to the ERC_DIC operator and executing the algorithm, the operator will return an output annotation which is of type Vendor, begins at character 0, ends at character 2, and includes the content "SAP."

FIG. 8 illustrates another example of a extraction operator according to one embodiment of the present invention. Projection operator 801 may extract text using two regular expressions and is a second example of a rule based extraction operator. The first regular expression may be used to represent the point to begin extracting text while the second regular expression may represent the point to end extracting text. These first and second regular expressions are known as the begin expression and the end expression, respectively. In one example implementation, Projection operator 810 receives input annotation "InAnnot," begin expression "r1," end expression "r2," output annotation type "OutAnnotType", and context. The operator matches each input annotation against the specified regular expressions. If any portion of the input annotation contains both the begin and end regular expression, the text located between the two expressions may be extracted as a new annotation "annot[ ]." In this example, a context variable is defined to specify an analysis window or boundary. The specified context received in the operator may set the maximum number of characters to be examined between the begin and end expressions (i.e., a context window or boundary). Algorithm 820 illustrates one example implementation of Projection operation 810. As shown in the while loop at lines 9 to 25, algorithm 820 may perform several checks to ensure the end expression appears after the begin expression. For example at lines 10 to 12, the algorithm may perform a check to determine whether the text located between the expressions exceeds the limitations set by the context variable. At lines 13 to 15, the algorithm may perform checks to ensure the end expression is found after the begin expression. If the text located between the two expressions satisfies the specified rules, a new annotation is generated.

In a specific example, Projection operator 801 extracts anchor texts from a set of crawled HTML pages. A begin expression r1=<A> is defined to identify the beginning of the anchor text and an end expression r2=</A> is defined to identify the end of the anchor text. If the Projection operator were to receive the two expressions along with input annotation "<A>SAP Netweaver 5.0 Home page</A>," output annotation type "HTML_AnchorText," and context window of 30, the operator would return an output annotation with content "SAP Netweaver 5.0 Home page" of output annotation type "HTML_AnchorText."

Figure 9:
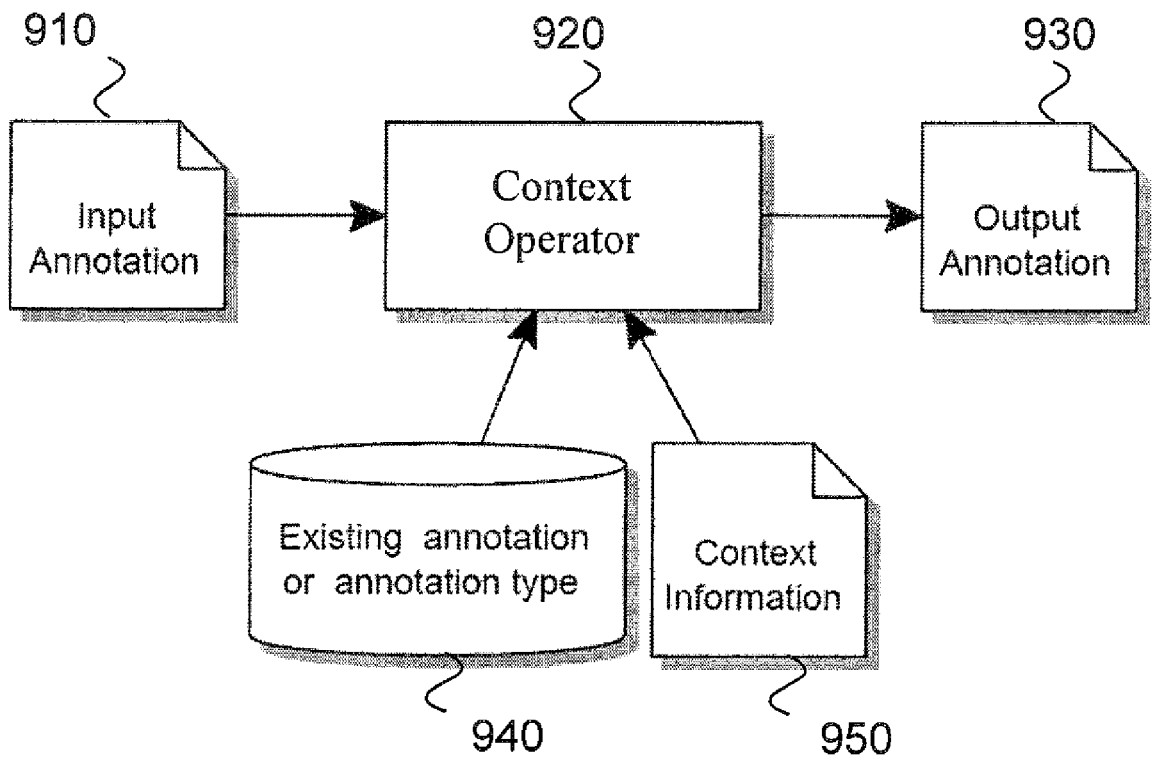
FIG. 9 illustrates a context operator according to one embodiment of the present invention.

FIG. 9 illustrates a context operator according to one embodiment of the present invention. Context operators identify and extract features based on other annotations or predefined analysis criteria, or both, and output one or more new annotations. In this example, context operator 920 may receive an input annotation 910, an existing annotation or annotation type 940, and context information 950. Context operator 920 generates output annotation 930 based on the inputs. One or more existing annotations 940 may provide reference annotations that may be used by context operator 920 for generating output annotation 930. In one embodiment, existing annotation 940 includes multiple annotations stored in an annotation repository, for example. One example of an existing annotation 940 may be a character string. Context information 950 may specify analysis criteria to be used with operating on the input annotations and existing annotations. For example, context information may include setting the maximum number of characters that may be analyzed during an operation. Although input annotation 910 is illustrated here as a single annotation, it may also be multiple annotations or even documents or other search item inputs. In one embodiment, multiple annotations are stored as a set of annotations and received by context operator 920. In another embodiment, multiple annotations are individually coupled to context operator 920, thereby allowing the operator to process multiple annotations in parallel. A variety of specific implementations may be created based on the structure of FIG. 9. Exemplary implementations are described in FIGS. 10A-B.

FIG. 10A illustrates examples of context operators according to one embodiment of the present invention. Two examples of context operators are a left context operator 1001 ("LC") and a right context operator 1002 ("RC"). LC and RC operators extract from a given annotation the left and right contexts, respectively, relative to a reference annotation. For example, the LC and RC operators may extract a plurality of text adjacent to the reference annotation (e.g., to the left of or right of the reference annotation). The extraction may further be constrained within specified analysis windows or boundaries (e.g., context boundaries) and may preserve the original annotation, for example. The LC and RC operators may receive as input one or more reference annotations (e.g., existing annotations). These reference annotations may be used to mark the left or right context, for example. The operators include extraction logic that receives an input annotation, a reference annotation, a specified output annotation type, and a context window and produce new annotations. Embodiments of the LC, RC, or other context operators may use a single annotation as input or a set of annotations belonging to a specific annotation type, for example.

An example LC operator is shown at 1010. The LC operator in this example includes four parameters: "InAnno" specifies the input annotation, "ContextAnno" specifies the reference annotation that in this case marks the end of the left context (i.e., the boundary), "OutAnnotType" specifies the type of the output annotation, and the attribute "context," which is short for "ContextWindow" or "ContextW", specifies the length or window for the extracted left context. A context window specification may be based on the number of characters, the number of terms delimited by a white space, or sentence boundaries, for example. The LC operator executes the operation as follows: It takes annotation specified with InAnno, checks if it will find the ContextAnno. It stores any characters left of ContextAnno and analyzes the number of characters up to the amount specified by the parameter "contextWindow." The operator may generate and store the output as a new annotation of the type OutAnnotype in the variable annot.

In many instances, product names and vendor names precede version numbers. Accordingly, one example application of the LC operator may be the extraction of either vendor or product, or both, if the version number is know. For example, for an annotation (e.g., 'SAP NETWEAVER 5.0') where the version (e.g., '5.0') has been recognized, the LC operator may be used to determine the vendor or product or both. The LC operator 1010 may be used with the following parameters: InAnno='SAP Netweaver 5.0' which is of the type SAP Products, ContextAnno is the version information (e.g., an annotation with the text '5.0'), OutAnnotType is set to 'LC ProductVersion', and "contextWindow" is set for this example to 50 characters. LC operator 1010 will generate a new annotation 'SAP NETWEAVER' which will begin at character 0 and end with character 13 of the input annotation. The output annotation will be of the type 'LC ProductVersion'. An example algorithm for the LC operator is shown at 1030.

The RC operator will work in the same manner as the LC operator; however, the right text of the input annotation will be analyzed based on the input annotation and context window to generate and store a new annotation. LC and RC operators may also be used with a set of annotations as left or right context (annotation of given type ContextAnnoType). In that case the interface (e.g., for LC) is illustrated at 1020. The parameter ContextAnnoType now denotes a set of annotations.

FIG. 10B illustrates another example use of the LC and RC context operators. In this example, the inputs are error messages 1040, and the operators are used to determine the left and right context of all annotations which include an error message. Two error messages 1050 have been extracted and may be used as reference annotations for the operators: 'TSV_TNEW_PAGE_ALLOC_FAILED' and 'OBJECTS_OBJREF_NOT_ASSIGNED' which are of the annotation type 'error message.' After executing the LC operator with context boundaries contextWindow of 50 characters we extract the following left contexts 1060: 'Log analysis: Termination', 'Runtime error', 'Dump:', 'APD Dump:', and 'RSSOREKI:'. After executing the RC operator, the output annotations 1070 are 'in the Customizing', 'during change run', and '(but processed)'.

Figure 11A:
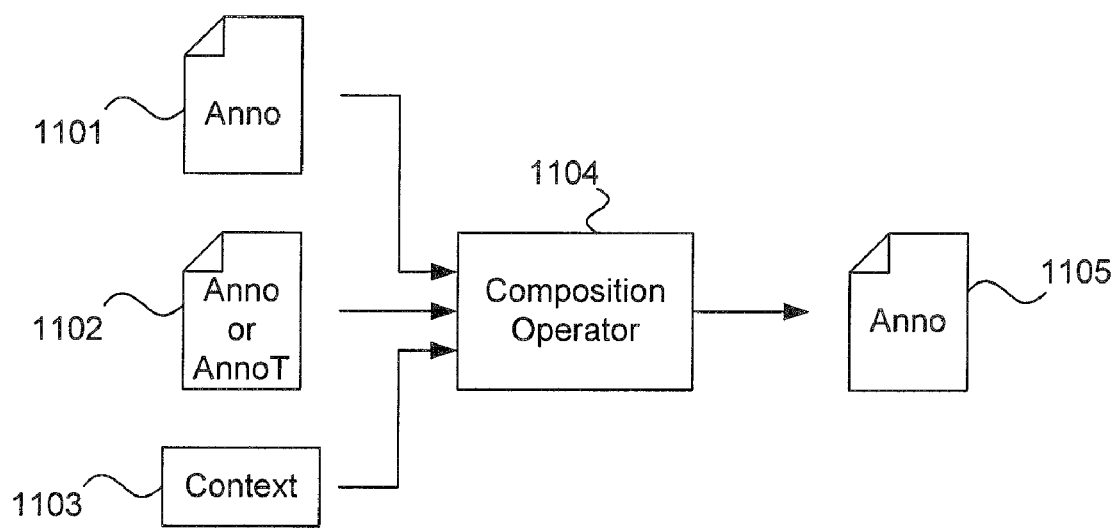
FIGS. 11A-B illustrate composition operators according to embodiments of the present invention.
Figure 11B:
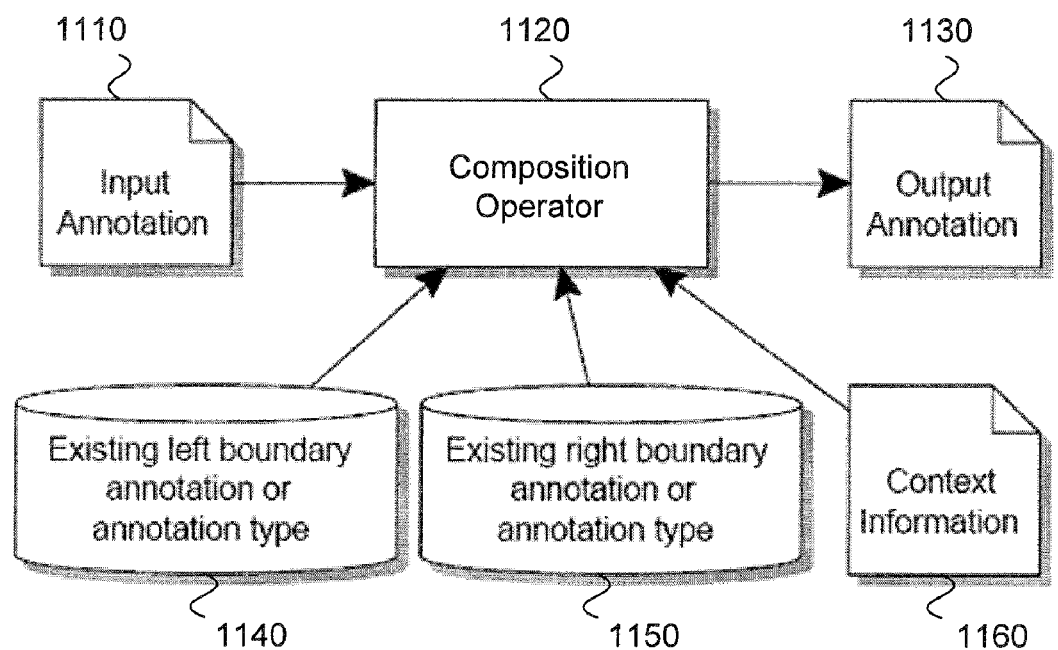

FIG. 11A illustrates a composition operator according to one embodiment of the present invention. Composition operators generate annotations based on the relationships between multiple input annotations or annotation types. For instance, composition operator 1104 may receive an input annotation 1101 and another input annotation or annotation type 1102 and context 1103 corresponding to a relationship between the inputs. The composition operator generates an annotation 1105 based on the relationships between the inputs. A more detailed example of a composition operator's inputs is shown in FIG. 11B. In this example, composition operator 1120B receives an input annotation 1110, an existing left boundary annotation or annotation type 1140, an existing right boundary annotation or annotation type 1150, and context information 1150 to produce an output annotation 1130.

FIG. 12 illustrates one example of a composition operator according to one embodiment of the present invention. Often the text between two recognized annotations or annotation types is of interest and may be identified using two existing annotations or annotation types. BETWEEN operator 1201 may be used to perform such a function. The BETWEEN operator 1201 receives an input annotation and two references, which may be either two annotations or two annotation types. Some embodiments may further receive a context window and specified output annotation type. The output of the BETWEEN operator 1201 is an annotation comprising data (e.g., text) from the input annotation that is between the two references if the references are found in the input annotation.

An example implementation of the BETWEEN operator is shown at 1210. This implementation of the BETWEEN operator extracts text from an input annotation "InAnno" between two existing annotations "L_Anno" (i.e., left annotation) and "R_Anno" (i.e., right annotation) within a given context window "contextW". The extracted text is placed in an output annotation "annot[ ]" of a specified output annotation type "OutAnnoType." For example, if the vendor information ("SAP") and the version information ("5.0") have already been extracted, then this information may be used to extract product information from input annotations. In particular, "L_Anno" may be set equal to the vendor name "SAP" and "R_Anno" may be set equal to the version number "5.0". The context window may be set in this example to 50 characters and the output annotation type "OutAnnotType" may be specified as "product name." Accordingly, if an input annotation is InAnno="SAP NETWEAVER 5.0," then the BETWEEN operator analyzes the input annotation to find "SAP" and "5.0". If these two inputs match the text of an input annotation and are within 50 characters of each other, then the BETWEEN operation extracts the text between "SAP" and the text "5.0". The BETWEEN operator may perform a check to ensure that the extracted text does not exceed the maximum character lengths and if not stores the extracted text "NETWEAVER" starting from character 3 to character 13 as an annotation of the OutAnnotType="product name."

Executing the BETWEEN operation on a set of annotations may be performed by specifying a set of left and right annotations instead of a single left and right annotation. In one embodiment, the references may be specified by an annotation type. For example, the BETWEEN operator may iterate over each input annotation and check if an annotation matches with one instance of the first type (e.g., a left type—"L_Annotype") and one instance of a second type (e.g., a right type—"R_Annotype"). An example interface for a BETWEEN operation that extracts information from input annotations based on annotation types is shown at 1220, where L_Annotype and R_Annotype specify the type. Similarly, the references annotations may be further limited by specifying a set of annotations for both the left and the right references. For example, an annotation type to recognize product vendor information (e.g., VENDOR={SAP; IBM}) and another one to recognize product version information (e.g., VERSION={5.0; 5.0A}) may be been previously specified. This information may be used to extract specific product information from a plurality of input annotations. For example if the following input annotation set is received (e.g., InAnnos={SAP NETWEAVER 5.0; SUSE Linux 9.0; SAP INSURANCE FS-RI 4.63; IBM DB2 5.0}, then all vendors are defined in the annotation type VENDOR set except for the annotation 'SUSE Linux 9.0'. Additionally, input annotations 'SAP NETWEAVER 5.0' and 'IBM DB2 5.0' are in the annotation type VERSION set. For the input annotations that are in both sets and within the specified context window, BETWEEN extracts "NETWEAVER" and "DB2" and places these extracted items in one output annotation set having two values (or alternatively into two separate annotations) of type "product name." An example algorithm for implementing the BETWEEN operator is shown at 1230.

FIG. 13 illustrates another example of a composition operator according to one embodiment of the present invention. It is often desirable to express a relationship, such as a semantic relationship, between two entities (e.g., an organization was acquired by another one). However, in a text corpus several term combinations between two organization entities are typically used by authors to express that relationship (e.g., A 'acquired' B, A 'was acquired by' B, A 'bought' B etc). The SUCCEEDS operator 1301 composes two entities and a single or several relationships between them into a complex composed annotator. The relationship may be expressed using a single regular expression, for example.

One example implementation is illustrated at 1310. SUCCEEDS operator 1310 receives an input annotation, two reference annotations (e.g., a left annotation and a right annotation), and one or more regular expressions expressing a relationship between these two annotations. In this example, the operator further receives a context window, which determines the size and type of the boundaries between the two annotations.

The SUCCEEDS operator checks if both reference annotations appear within the specified context window in the input annotation and selects those annotations which match the defined regular expression expressing the relationship. The result of this operator is an annotation comprising the elements of the input annotation that match these criteria. For example, it may be desirable to extract the relationship Peter works for SAP. This relationship may be expressed using the following example terms: "works for", "works with", "works at", "is with". The SUCCEEDS operator receives one input annotation InAnno, a left annotation which is 'Peter', a right annotation, which is 'SAP', a regular expression which is r1=(\w+(works for|works with|works at|is with)\w+), a context window (e.g., of contextW=50 characters), and an output annotation type (e.g., employment relationship). The SUCCEEDS operator executes against the following input annotation: "Peter, a high ranking IR expert, now works for SAP Germany." The SUCCEEDS operator generates a match, since it matches all parameters, and generates an output annotation comprising "Peter works for SAP" of type OutputAnnoType=employment relationship.

In some applications, a SUCCEEDS operator may be executed on a set of annotations. An example implementation of such a SUCCEEDS operator is shown at 1320. For example, in some applications it may be desirable to extract a more generic relationship such as "PERSON is working for VENDOR." In this case, the interface of a SUCCEEDS operation is shown at 1320. Here, the SUCCEEDS operation may receive a type or set of annotations. For example, a first reference annotation may be the left annotation type defined as follows:

PERSON={Peter Meyer, Alexander Hill}.
Similarly, the second reference annotation may be the right annotation type defined as follows:

VENDOR={SAP, IBM}.
Additionally, the SUCCEEDS operator may receive the relationship "is working for" which is expressed using r1 as shown the example above, the context window contextW=50 characters, and a specified output annotation type OutAnnoType="employment relationship". The SUCCEEDS operator 1320 will match each InAnno where one person was recognized in PERSONS and where one vendor was recognized in VENDORS and where the relation r1 was discovered within the specified context window and output one or more annotations of type "employment relationship" comprising the person, relationship, and vendor. An example algorithm for implementing the SUCCEEDS operator is shown at 1330.

FIG. 14A illustrates another example of a composition operator according to one embodiment of the present invention. The BIND operator 1401 specifies relationships between annotations based on the extraction process. Such information may be used by a search application (i.e., a search engine) using the results of the extraction process. For example, a search application may use such information to distinguish if a certain annotation was created from a semantically clear source of information (e.g., the title, the anchor text) as opposed to an annotation that was created from semantically unclear source (e.g., the body of a web page). Two example relation types (i.e., bind types) that are produced by the BIND operator are hierarchy and attribute. Hierarchy specifies a relationship where one or more annotations were used to create another annotation (e.g., ERC_RULE, ERC_DIC, LC, RC). Attribute specifies the process used by one or more to create another annotation (e.g., BETWEEN, SUCCEEDS). Attribute information may be based on extraction process knowledge, for example. A BIND operator may receive one or more input annotations and generate an output annotation that is associated with the inputs or even annotation that were used to create the inputs and define relationships therebetween.

One example of the BIND operator is shown at 1410. The operator receives two annotations "InAnno1" and "InAnno2." These annotations may be derived from the same document (i.e., they have common parent annotation). The input parameter "AnnotType" determines the type of output annotation, and the "BindType" specifies the type of relation that the output annotation will express (e.g., annotation A was created from annotations B and C (Hierarchy) or annotation A is a composition of B and C (Attribute)). The output annotation may be stored in a hierarchy under the lowest common parent of InAnno1 and InAnno2, for example.

An example algorithm for implementing one BIND operation is illustrated in 1420. In this example, the annotations may be implemented as objects, such as Java™ objects, C++ objects, or other equivalent programming structures. The example algorithm receives two input annotations and outputs an annotation that is a composition of the two input annotations and includes relationship information. For example, if InAnno1="SAP", InAnno2=5.0, AnnotType="product", and type="Attribute," then the output annotation will include "SAP 5.0" of type "product" and have a specified relationship of "Attribute" with respect to the input annotations. Further, in this example, the output annotation is an object storing the common parent of the two input annotations. Referring to FIG. 14B, it can be seen that the output annotation 1434 ("Product") of the example algorithm 1420 is derived from annotations 1432 ("Vendor") and 1433 ("Version"). Product 1434 is has an "Attribute" relationship to the two input annotations. The output annotation object may have a specified type (annotType=Attribute). The output annotation may store the ID of the input annotations with the specified type information (here, "Attribute") using the "addChild" method. Similarly, annotations 1432 and 1433 have a common parent annotation 1431 ("Webpage_Title"). This information may be stored in the output annotation object using the "setParent" method. Finally, the location where the input annotations were found in the parent may be stored using "setBeg" method, which determines where the first input annotation begins in the common parent, and the "setEnd" method, which determines where the second input annotation ends in the common parent. This information may be stored in a repository and used by a search engine to refine and improve search results.

Figure 15:
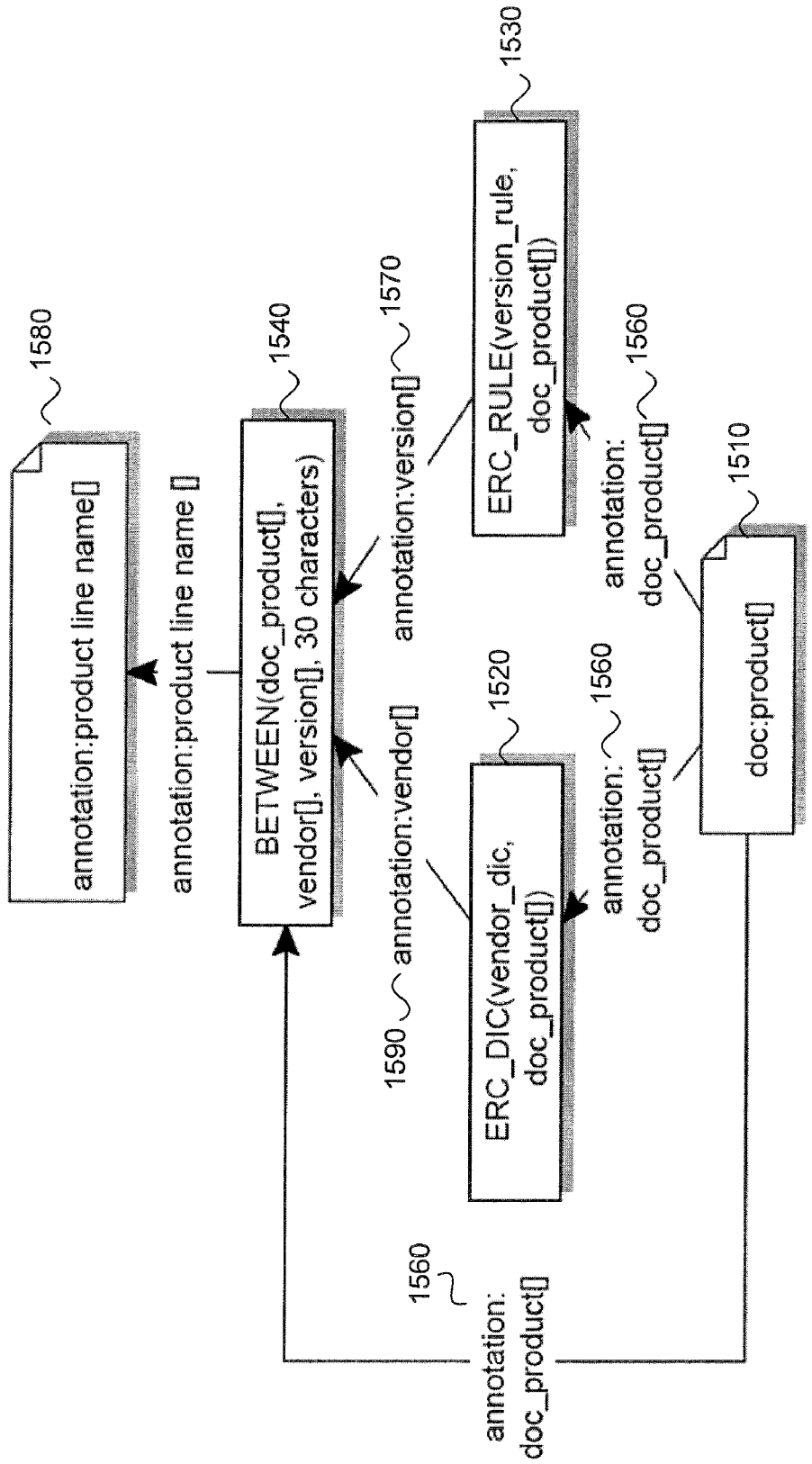
FIG. 15 illustrates an example of an annotator comprising multiple composed operators according to one embodiment of the present invention.

FIG. 15 illustrates an example of an annotator comprising multiple composed operators according to one embodiment of the present invention. Annotator 1500 receives a document 1510 containing a list of products (e.g., complex product names). For example, the document may be a database column, an excel sheet, or a page from a website such as an HTML document. Document 1510 may be processed such that each complex product name represents a signal annotation, for example. These annotations may be specified as annotation type "product," for example, and represented together as product annotations set 1560 (e.g. "annotation: doc_product[ ]"). Product annotations set 1560 is first processed by an extraction operator. In this example, product annotations set 1560 is received by ERC_DIC operator 1520 and ERC_RULE operator 1530. ERC_DIC operator 1520 receives product annotations set 1560 along with a list of product vendor names (i.e. vendor_dic). For each annotation in product annotations set 1560, ERC_DIC operator may attempt to match the annotation with the list of product vendor names. If a match is found, an output annotation of type "vendor," containing the vendor name, may be generated. At the completion of processing product annotations set 1560, ERC_DIC operator may have generated a set of annotations 1590 ("annotation:vendor[ ]") containing the vendor names of the products in the list (i.e. a vendor annotations set). ERC_RULE operator 1520 receives product annotations set 1560 along with a version rule. For each annotation of product annotations set 1560, ERC_RULE operator may attempt to extract the version of the products by applying the version rule. At the completion of processing product annotations set 1560, ERC_RULE operator generates a set of annotations 1570 ("annotation:version[ ]") containing the version portion of the products. The next operator used may be a composition operator. In this example, the BETWEEN operator 1540 may then receive vendor annotation set 1590, version annotation set 1570, and product annotation set 1560. BETWEEN operator 1540 may extract from product annotation set 1560 the text between the vendor name and the version number. This may result in the creation of product line annotation set 1580. Therefore, the output of composite annotator 1500, comprising an extraction operator and a composition operator, may include a vendor annotation set 1590, version annotation set 1570, and product line annotation set 1580.

Figure 16:
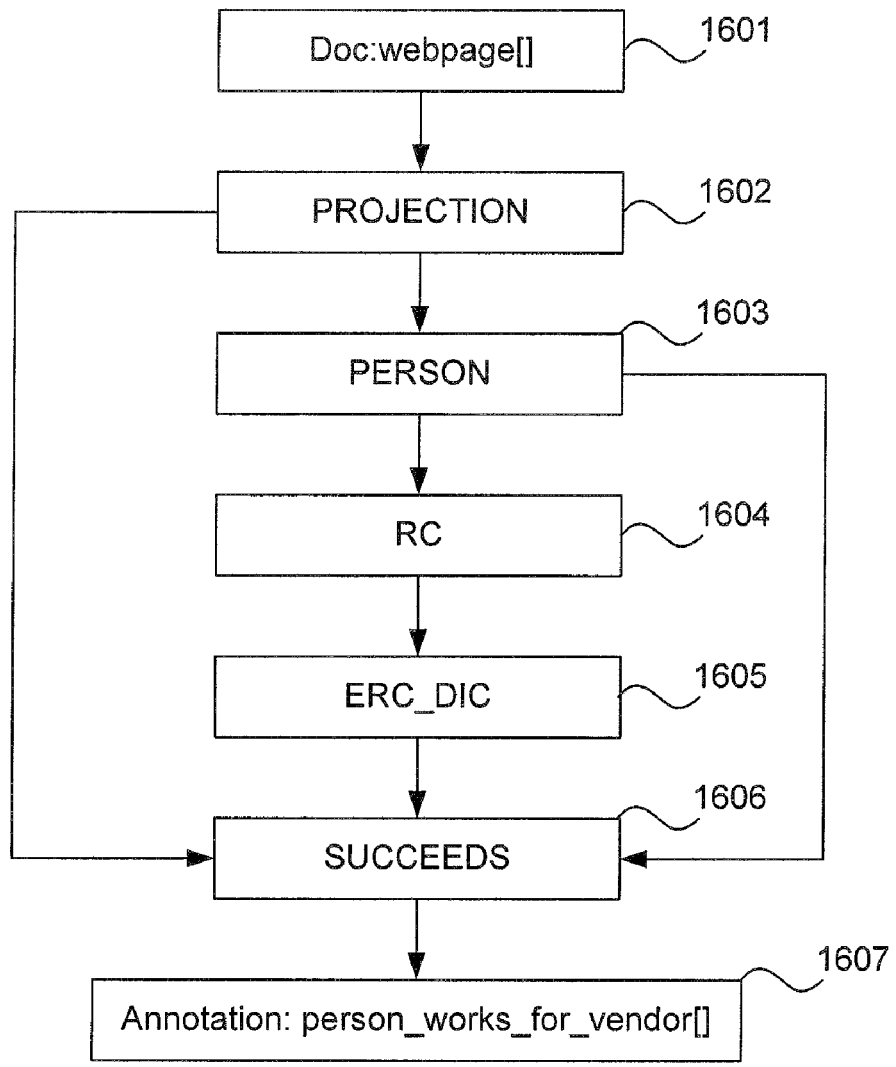
FIG. 16 illustrates another example of an annotator comprising multiple composed operators according to one embodiment of the present invention.

FIG. 16 illustrates another example of an annotator comprising multiple composed operators according to one embodiment of the present invention. The goal of this flow is to extract persons, vendors, and the relationship "person works for vendor" from web page anchor text. For extracting persons in this example we show how to integrate a predefined special purpose annotator (e.g., PERSON) with the generic set of composable annotators described above. For this flow a set of (e.g., crawled) web pages 1601 has been accessed (e.g., "Doc:webpage"). The web pages may be partitioned into annotations ("annotation:webpage[ ]") and assigned annotations types (e.g., webpage). From each web page we extract the text between HTML anchor elements using the PROJECTION operator 1602. As parameters we specify two regular expressions denoting the left and right anchor text boundaries and process the web pages using the PROJECTION operator (e.g., "PROJECTION(anchor_rule_left, anchor_rule_right, webpage[ ])"). The extracted annotations (e.g., "annotation:anchor[ ]") are denoted with the type "anchor." From each anchor we extract persons using a special purpose predefined annotator 1603 that receives as input the extracted "annotation:anchor[ ]" (e.g., "PERSON("anchor[ ]"), and each output annotation is denoted with the type "person." Next, from the set of annotation of the "person" we extract the right context using the RC operator 1604 with a context window of 30 characters (e.g., "RC(person[ ], 30 char)"). The resulting output annotations ("annotations: rc_person[ ]") are of type "rc_person" and may be used to recognize vendors. The ERC_DIC operator 1605 is executed with a dictionary of vendor information on each annotation of the type "rc_person" (e.g., "ERC_DIC(vendor_dic, rc_person)"). The output annotations of ERC_DIC 1605 are vendor names ("annotations: vendor[ ]") of type "vendor". Finally, to spot a potential relationship between a person and a vendor in a title we execute the SUCCEEDS operator 1606. The inputs to the SUCCEEDS operator are the anchor text annotations ("annotation: anchor[ ]") generated by PROJECTION operator 1602, the extracted person annotations ("annotation: person[ ]") generated by PERSON operator 1603, and the extracted vendor information ("annotation: vendor[ ]") generated by ERC_DIC operator 1605. Furthermore, we define a rule including semantical equivalent expressions for working for as defined in the SUCCEEDS example above and a character window of 30 characters. The final SUCCEEDS operator in this example is as follows:

SUCCEEDS(anchor[ ], person[ ], vendor[ ], works_for_rule, 30 char)

The resulting output annotations 1607 ("annotation: person_works_for_vendor") may be stored as type "person_works_for_vendor" for use by a search engine.

Figure 17:
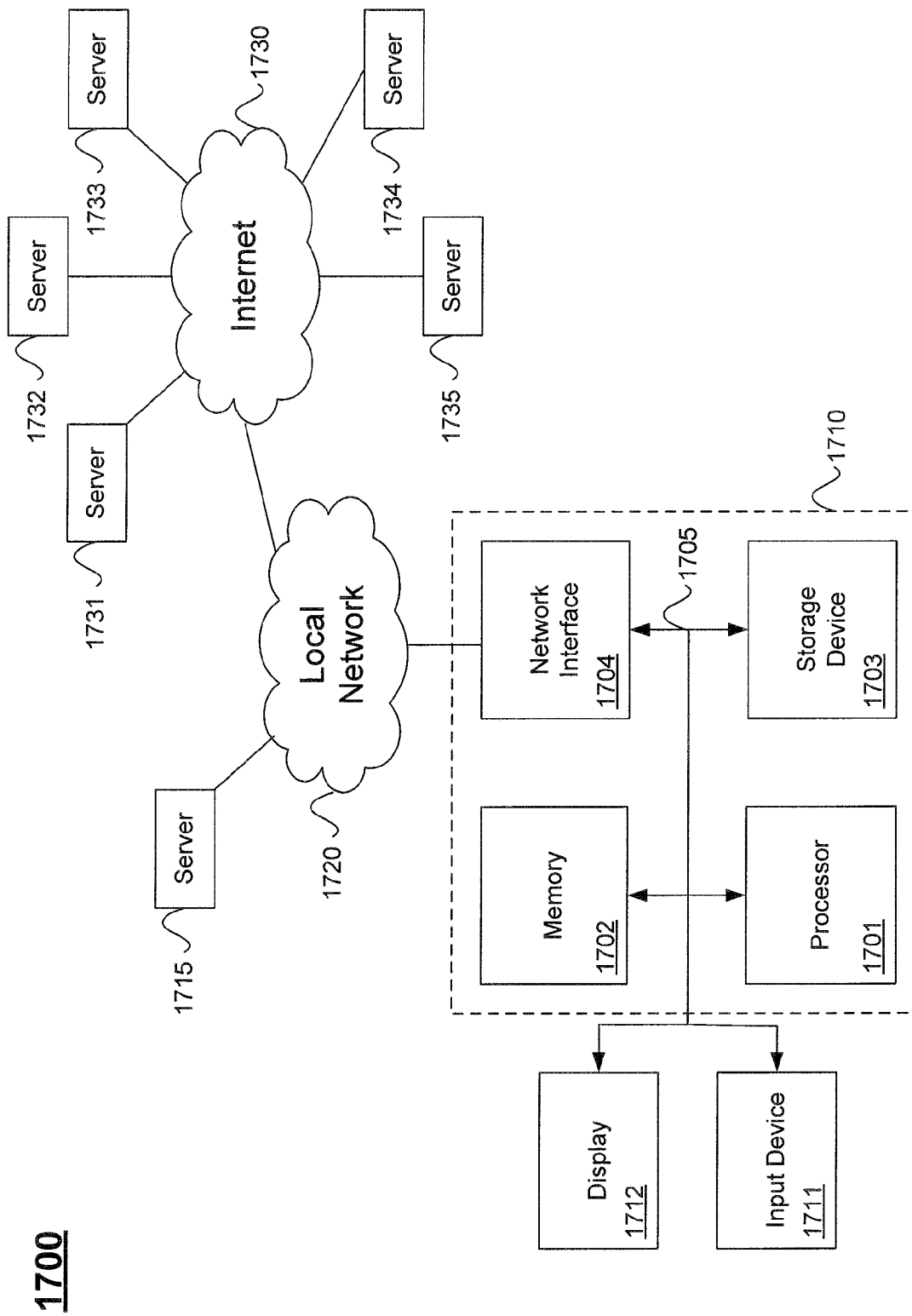
FIG. 17 illustrates an example computer system and networks that may be used to implement the present invention.

FIG. 17 illustrates an example computer system and networks that may be used to implement the present invention. Computer system 1710 includes a bus 1705 or other communication mechanism for communicating information, and a processor 1701 coupled with bus 1705 for processing information. Computer system 1710 also includes a memory 1702 coupled to bus 1705 for storing information and instructions to be executed by processor 1701, including instructions for performing the techniques described above. This memory may also be used for storing temporary variables or other intermediate information during execution of instructions to be executed by processor 1701. Possible implementations of this memory may be, but are not limited to, random access memory (RAM), read only memory (ROM), or both. A storage device 1703 is also provided for storing information and instructions. Common forms of storage devices include, for example, a hard drive, a magnetic disk, an optical disk, a CD-ROM, a DVD, a flash memory, a USB memory card, or any other medium from which a computer can read.

Computer system 1710 may be coupled via bus 1705 to a display 1712, such as a cathode ray tube (CRT) or liquid crystal display (LCD), for displaying information to a computer user. An input device 1711 such as a keyboard and/or mouse is coupled to bus 1705 for communicating information and command selections from the user to processor 1701. The combination of these components allows the user to communicate with the system.

Computer system 1710 also includes a network interface 1704 coupled with bus 1705. Network interface 1704 may provide two-way data communication between computer system 1710 and the local network 1720. The network interface 1704 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1704 sends and receives electrical, electromagnetic, or optical signals that carry digital data streams representing various types of information.

Computer system 1710 can send and receive information, including search requests, search results, documents, or annotations, through the network interface 1704 to an Intranet or the Internet 1730. In the Internet example, documents, annotations, or repositories of annotations may reside on multiple different computer systems 1710 or servers 1731 across the network. Composite annotators described above may be created on a local computer system and deployed on one or more servers, for example. A server 1731 may transmit search requests, search results, documents, or annotations, through Internet 1730, local network 1720, and network interface 1704 to a component on computer system 1710. Composite annotators or reusable operators may be implemented on the same system or on a different machine than annotators or operators. The annotations or other inputs may then be sent to the processor 1701 via bus 1705 for processing. The received information may then be processed by processor 1701 and/or stored in storage device 1703, or other non-volatile storage for later execution. This process of sending and receiving information may be applied to communication between computer system 1710 and any of the servers 1731 to 1735 in either direction. It may also be applied to communication between any two servers 1731 to 1735.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of extracting information comprising:
    defining a plurality of reusable operators, wherein each operator performs a predefined information extraction task different from the other operators;
    specifying a composition of said reusable operators to form a composite annotator, wherein each operator receives a searchable item and generates one or more output annotations; and
    storing the output annotations for use during a search,
    wherein the plurality of reusable operators include an extraction operator, wherein the extraction operator identifies features based on predefined criteria and generates one or more output annotations comprising the features extracted from one or more searchable items,
    the searchable items comprising text, wherein the extraction operator extracts specified text by matching text in each of said searchable items against a first rule and a second rule, wherein if text satisfies the first rule and the second rule, text between the text satisfying the first rule and text satisfying the second rule is stored in an output annotation, and wherein the extraction operator assigns a specified type to each of the one or more output annotations.

2. The method of claim 1, the searchable items comprising text, wherein the extraction operator extracts specified text using a specified rule, and assigns a specified type to each of the one or more output annotations, wherein extracted features in the one or more output annotations comprise text that satisfies the rule.

3. The method of claim 1, the searchable items comprising text, wherein the extraction operator extracts specified text by matching text in each of said searchable items against a specified list of text and assigns a specified type to each of the one or more output annotations.

4. The method of claim 1, wherein the plurality of reusable operators include a context operator, wherein the context operator identifies features based on one or more other annotations and generates one or more output annotations comprising the identified features extracted from one or more searchable items.

5. The method of claim 4 wherein the context operator identifies features based on predefined analysis criteria.

6. The method of claim 4, the searchable items comprising text, and wherein the context operator receives an input annotation and a reference annotation and generates an output annotation comprising a plurality of text adjacent to the reference annotation.

7. The method of claim 6 wherein the context operator receives a specification of the output annotation type.

8. The method of claim 7 wherein the context operator receives an analysis window specifying the number of characters to be extracted from the input annotation.

9. The method of claim 6 wherein the context operator extracts text to the left of said reference annotation.

10. The method of claim 6 wherein the context operator extracts text to the right of said reference annotation.

11. The method of claim 1, wherein the plurality of reusable operators include a composition operator, wherein the composition operator generates one or more output annotations based on a relationship between a plurality of input annotations.

12. The method of claim 1, wherein the plurality of reusable operators include a composition operator, wherein the composition operator generates an output annotation based on a relationship between an input annotation and an input annotation type.

13. A computer-implemented method of extracting information comprising:
    defining a plurality of reusable operators, wherein each operator performs a predefined information extraction task different from the other operators;
    specifying a composition of said reusable operators to form a composite annotator, wherein each operator receives a searchable item and generates one or more output annotations; and
    storing the output annotations for use during a search,
    wherein the plurality of reusable operators include an composition operator, the searchable items comprising text, and wherein the composition operator receives an input annotation and two reference annotations and generates one or more output annotations comprising text between the two reference annotations.

14. The method of claim 13 wherein the composition operator receives a specification of an output annotation type.

15. The method of claim 13 wherein the composition operator receives a specification of a context window.

16. A computer-implemented method of extracting information comprising:
defining a plurality of reusable operators, wherein each operator performs a predefined information extraction task different from the other operators;
specifying a composition of said reusable operators to form a composite annotator, wherein each operator receives a searchable item and generates one or more output annotations; and
storing the output annotations for use during a search,
wherein the plurality of reusable operators include an composition operator, the searchable items comprising text, and wherein the composition operator receives an input annotation and two reference annotation types and generates one or more output annotations comprising text between the two reference annotation types.

17. The method of claim 16, the two reference annotation types each comprising a set comprising a plurality of annotations.

18. A computer-implemented method of extracting information comprising:
defining a plurality of reusable operators, wherein each operator performs a predefined information extraction task different from the other operators;
specifying a composition of said reusable operators to form a composite annotator, wherein each operator receives a searchable item and generates one or more output annotations; and
storing the output annotations for use during a search,
wherein the plurality of reusable operators include an composition operator, the searchable items comprising text, and wherein the composition operator receives an input annotation, two reference annotations, and a rule, and generates one or more output annotations comprising text between the two reference annotations that satisfy the rule.

19. A computer-implemented method of extracting information comprising:
defining a plurality of reusable operators, wherein each operator performs a predefined information extraction task different from the other operators;
specifying a composition of said reusable operators to form a composite annotator, wherein each operator receives a searchable item and generates one or more output annotations; and
storing the output annotations for use during a search,
wherein the plurality of reusable operators include an composition operator, the searchable items comprising text, and wherein the composition operator receives an input annotation, two reference annotation types, and a rule, and generates one or more output annotations comprising text between the two reference annotation types that satisfy the rule.

20. A computer-implemented method of extracting information comprising:
defining a plurality of reusable operators, wherein each operator performs a predefined information extraction task different from the other operators;
specifying a composition of said reusable operators to form a composite annotator, wherein each operator receives a searchable item and generates one or more output annotations; and
storing the output annotations for use during a search,
wherein the plurality of reusable operators include an composition operator, and
wherein the composition operator receives an input annotation, first and second reference annotations, and an expression specifying a semantic relationship between the first reference annotation and the second reference annotation, and wherein the composition operator checks if the first and second reference annotations are within the input annotation and selects annotations matching the expression.

21. The method of claim 20 wherein the first reference annotation is a left annotation and the second reference annotation is a right annotation.

22. The method of claim 20 wherein the composition operation further receives a context window, and wherein both the first and second reference annotations are within the context window.

23. The method of claim 20 wherein the first and second reference annotations are one of (i) a single first reference annotation and a single second reference annotation, (ii) first and second annotation types, or (iii) first and second sets of annotations.

24. A computer-implemented method of extracting information comprising:
defining a plurality of reusable operators, wherein each operator performs a predefined information extraction task different from the other operators;
specifying a composition of said reusable operators to form a composite annotator, wherein each operator receives a searchable item and generates one or more output annotations; and
storing the output annotations for use during a search,
wherein the plurality of reusable operators include an composition operator, and
wherein the composition operator receives a first input annotation, a second input annotation, a first parameter for specifying the output annotation type, and a second parameter for specifying a type of relationship that the output annotation will express, wherein the second parameter specifies the type of relationship as one of (i) a hierarchy, wherein the output annotation was created from the first input annotation and the second input annotation, or (ii) an attribute, wherein the output annotation is a composition of the first input annotation and the second input annotation.

25. The method of claim 24, wherein the output annotation is an object, the output annotation object storing a common parent to the first and second input annotations.

26. A computer-readable medium containing instructions for controlling a computer system to perform a method of extracting information comprising:
receiving a plurality of first annotations, the first annotations comprising text;
processing the plurality of first annotations using a reusable extraction operator, and in accordance therewith, generating a plurality of second annotations, wherein the extraction operator identifies text in the first annotations that satisfy one or more rules or match text in a predefined list of text, and generates one or more output annotations comprising the identified text; and
processing the plurality of second annotations using a reusable context operator, and in accordance therewith, generating a plurality of third annotations, the second annotations comprising text, wherein the context operator receives each of the second annotations and a reference annotation and generates output annotations comprising a plurality of text adjacent to the reference annotation;

processing the plurality of third annotations using a reusable composition operator, wherein the composition operator receives each of the third annotations, one or more first reference annotations, and one or more second reference annotations, and generates output annotations comprising text between the first and second reference annotations.

27. The computer-readable medium of claim 26 wherein the composition operator receives a rule, and wherein output annotations comprise text that satisfies the rule, and if an annotation in the plurality of third annotations does not include the first reference annotation or the second reference annotation or does not satisfy said rule, then no output annotation is generated by the composition operator.

28. The computer-readable medium of claim 26, further comprising
storing the plurality of third annotations in a repository; and
accessing the plurality of third annotations in response to a search request.

29. A computer-readable medium containing instructions for controlling a computer system to perform a method of extracting information comprising:
receiving a plurality of first annotations;
processing the plurality of first annotations using an reusable extraction operator, and in accordance therewith, generating a plurality of second annotations; and
processing the plurality of second annotations using a reusable composition operator, and in accordance therewith, generating a plurality of third annotations, the second annotations comprising text, wherein the composition operator receives each of the second annotations, one or more first reference annotations, and one or more second reference annotations, and generates output annotations comprising text between the first and second reference annotations.

* * * * *